United States Patent [19]

Kato et al.

[11] Patent Number: 5,164,870
[45] Date of Patent: Nov. 17, 1992

[54] MAGNETIC HEAD EMPLOYING A MAGNETIC GAP MATERIAL COMPOSED OF $CR_2O_3$

[75] Inventors: Minoru Kato; Michio Yanagi, both of Chichibu, Japan

[73] Assignee: Canon Denshi Kabushiki Kaisha, Chichibu, Japan

[21] Appl. No.: 719,686

[22] Filed: Jun. 25, 1991

Related U.S. Application Data

[63] Continuation of Ser. No. 421,232, Oct. 13, 1989, abandoned.

[30] Foreign Application Priority Data

| Oct. 13, 1988 | [JP] | Japan | 63-255895 |
| May 17, 1989 | [JP] | Japan | 1-121332 |
| Jun. 16, 1989 | [JP] | Japan | 1-154171 |

[51] Int. Cl.⁵ .......................... G11B 5/23; G11B 5/235
[52] U.S. Cl. .................................. 360/119; 360/120; 360/122; 360/126
[58] Field of Search ............... 360/110, 119, 120, 121, 360/122, 125, 126

[56] References Cited

U.S. PATENT DOCUMENTS

| 4,582,812 | 4/1986 | Furukawa et al. | 360/122 |
| 4,774,616 | 9/1988 | Kumasaka et al. | 360/110 |
| 4,803,338 | 2/1989 | Kumasaka et al. | 360/119 |
| 4,819,113 | 4/1989 | Kubota et al. | 360/122 |
| 4,953,049 | 8/1990 | Okuda et al. | 360/126 |
| 4,953,050 | 8/1990 | Kumura et al. | 360/126 |
| 5,001,590 | 3/1991 | Saito et al. | 360/126 |

FOREIGN PATENT DOCUMENTS

| 57-135419 | 8/1982 | Japan | 360/122 |
| 188811 | 8/1988 | Japan | |
| 64-32417 | 2/1989 | Japan | 360/122 |

*Primary Examiner*—Aristotelis Psitos
*Assistant Examiner*—Alfonso Garcia
*Attorney, Agent, or Firm*—Spencer, Frank & Schneider

[57] ABSTRACT

A magnetic head comprises a pair of magnetic core half parts abutted to each other and having magnetic alloy films on both abutted surfaces, a magnetic gap material composed of laminated films formed on the abutted surface of at least one of the pair of magnetic core half parts, and welding glass welding the pair of magnetic core half parts. The laminated films are composed of an $SiO_2$ film and a $Cr_2O_3$ film located in sequence from the magnetic core half part side. The laminated films serve to protect the magnetic alloy film from an erosion due to the welding glass. The $Cr_2O_3$ film ofers excellent wettability by the welding glass, thereby improving the strength of the magnetic head.

8 Claims, 11 Drawing Sheets

MAGNETIC HEAD EMPLOYING A MAGNETIC GAP MATERIAL COMPOSED OF CR$_2$O$_3$

This application is a continuation of application Ser. No. 07/421,232, filed Oct. 13, 1989, now abandoned.

BACKGROUND OF THE INVENTION

1. Field of the Invention

The present invention relates to a magnetic head for recording information on a magnetic recording medium and/or reproducing information from a magnetic recording medium, and more particularly to a magnetic head which is composed of a pair of magnetic core half parts abut-welded to each other.

2. Description of the Prior Art

With the improvement of magnetic recording techniques, there have emerged more chances of using a magnetic, recording medium with a high coercive force in several devices such as a video tape recorder (VTR), a rotary head type digital audio tape recorder (R-DAT), a floppy disc drive (FDD), and still video equipment (SV). Such a magnetic recording medium thus requires a magnetic head which is made of magnetic materials with a high saturation magnetization in order to enable recording onto such a high coercive force medium. To improve the recording density on a recording medium surface, tracks and magnetic gaps must be made narrower.

In recent years, in lieu of a conventional ferrite head, a compound type head, what is called, a metal-in-gap type magnetic head has emerged as a main stream device. The metal-in-gap type magnetic head is composed of magnetic metal such as Sendust (Fe-Al-Si alloy) or amorphous magnetic metal such as amorphous Fe deposited nearby a magnetic gap of a core half part mainly made of ferrite by means of a vacuum film formation technique such as sputtering, vacuum evaporation, or ion plating. In such a magnetic head, there have been proposed as a magnetic gap material SiO$_2$, TiO$_2$, ZrO$_2$, Cr, Al$_2$O$_3$, TiC and Ta$_2$O$_5$ and so on. Of these materials, SiO$_2$ is most widely used, because it has a hardness of proper value, and a different color from that of a magnetic metal.

Such a compound type magnetic core is manufactured in accordance with the steps shown in FIGS. 1A–1F.

At first, a substantially rectangular parallelopiped type ferrite base 1 as shown in FIG. 1A is made of a Ni-Zn ferrite or Mn-Zn ferrite.

Next, as shown in FIG. 1B, a track ditch 1a for defining a track width of the magnetic core is formed on the ferrite base 1 at a given pitch P matching the track width. A section removed from the track ditch 1a has a substantial V-shaped character, but the form may be a U-shaped character type or a trapezoidal shaped type.

In addition to the ferrite base 1, a ferrite base 2 is prepared which also has a track ditch 1a formed thereon. On the ferrite base 2 is formed an escape ditch 2a for winding a coil on a magnetic core as shown in FIG. 1C.

Next, as shown in FIG. 1D, several μm to several tens μm thickness of a magnetic alloy film 3 with a high saturation magnetization is formed on the tops of the ferrite bases 1 and 2 by means of a film forming technique. In addition, a magnetic alloy used as a material of the magnetic alloy film 3 may be properly selected among Fe or Co alloys. For example, it is preferable to employ an Fe-Al-Si alloy (Sendust).

Next, on the magnetic alloy films 3 of the ferrite bases 1 and 2 are each formed an SiO$_2$ film 4 for forming a magnetic gap for leaking a magnetic flux and/or picking up an external magnetic flux. As shown in FIG. 1E, the ferrite bases 1 and 2 are abutted and welded using a welding glass 5.

Then, the welded combination of the ferrite bases 1 and 2 is cut along a cut-away line 6 so as to obtain a magnetic core 7 as shown in FIG. 1F.

The magnetic core 7 has a structure wherein the magnetic core half parts 11 and 12 with magnetic metal films 3 formed on the opposite surfaces to one another are welded by the welding glass 5 through a magnetic gap G made of an SiO$_2$ film. At a final stage, a coil winding is provided on the magnetic core 7 and then the resulting magnetic core 7 is mounted onto a base (not shown) so as to complete a magnetic head.

In the foregoing conventional magnetic head, in general, there are the following three problems.

The first problem is that reaction of a Sendust or amorphous magnetic metal film with welding glass results in producing a reaction layer. The characteristics of the magnetic head are degraded due to the reaction layer.

Moreover, the reaction layer is not preferable from an authentic point of view, and weakens the strength of the welding between the glass and the metal, resulting in making the overall magnetic head fragile. It is, therefore, necessary to select a magnetic gap material which allows occurrence of the reaction layer to be suppressed.

The second problem is that the welding glass is often difficult to penetrate into a gap between the magnetic cores because wettability of the materials used, such as ferrite, Sendust, or amorphous magnetic metals, by the welding glass for retaining and fixing the magnetic gap is diverse. For holding the strength of a head chip, therefore, it is necessary to select a magnetic gap material having a high wettability by the welding glass.

The third problem is that abrasion resistance in a gap material must be considered when a very narrow gap is made, because the gap material located between the ferrite bases needs respective abrasion resistances matching those of a ferrite or the metals such as Sendust, and amorphous magnetic metal. It is, therefore, necessary to select a magnetic gap material which has abrasion resistance allowing respective materials to be uniformly abraded.

Further details concerning these problems will be explained below.

First, a description will be directed to the reaction between the welding glass and the magnetic alloy film. When the ferrite bases 1 and 2 are welded by a welding glass 5, the SiO$_2$ film 4 reacts with the welding glass 5, resulting in eroding the film 4, and the magnetic alloy film 3 reacts with the welding glass 5, resulting in eroding the alloy film 3. FIG. 2 is a plan view showing the circumference of a magnetic gap for illustrating the reaction between the welding glass and the magnetic alloy film. The foregoing reaction brings about an eroded portion 8 on the magnetic alloy film 3. The eroded portion serves to change the proper track width T of a magnetic gap G to advance along the magnetic gap G so as to widen the gap width, resulting in damaging the characteristics of the magnetic head.

To solve this shortcoming, as shown in FIGS. 3 and 4, on the magnetic alloy film 3 of the magnetic core there is formed a protective film 9 consisting of a metal which is excellent in corrosion resistance, such as $Ta_2O_5$ or Cr. On the protective film 9 is formed the $SiO_2$ film 4 which serves as a gap material. In the example shown in FIG. 3, the protective film 9 is formed on the overall surface, containing the portion facing the magnetic gap G of the track width T, of the magnetic alloy film 3. In the example shown in FIG. 4, the protective film 9 is formed on the magnetic alloy film 3 except for the portion facing the magnetic gap G. This example illustrates that the gap width is made narrower. In the manufacturing process, at first, the protective film 9 is formed on an overall surface of the magnetic alloy film 3 and then the portion of the film 9 facing the magnetic gap G is removed by some means such as lapping.

In the structure shown in FIG. 3, however, the variation of the gap widths becomes large, because the gap width of the magnetic gap G is defined on both thickness of the protective film 9 and the $SiO_2$ film. And, in case of defining a narrower gap width, the protective film 9 cannot be thick enough to protect the magnetic alloy film 3, resulting in causing the eroded portion.

In the structure shown in FIG. 4, on the other hand, if there is a shift of the track due to a mismatching in position of magnetic core half parts 11 and 12 corresponding to the ferrite bases 1 and 2, an eroded portion is produced in the vicinity of an end portion along the track width of the magnetic gap G.

In either one of the structures in FIGS. 3 and 4, a step of forming the protective film 9 should be included in the manufacturing process. It results in increasing the number of steps in the process and making the manufacturing cost higher. Further, these structures also have the problem that the reaction between the welding glass and the magnetic alloy film cannot be effectively prevented.

Of the foregoing materials used for a magnetic gap, Cr is effective for preventing occurence of a reaction layer, though. Cr looks like the metal magnetic film material in color when seen with an optical microscope. In the manufacturing process of a magnetic head, accordingly, it is difficult to inspect a gap length using an optical microscope, thereby increasing the manufacturing cost of a magnetic head.

Next, a description will be directed to wettability of a gap material by a welding glass. Each wettability of the conventional gap materials by the welding glass is listed in Table 1.

TABLE 1

| Gap Material | $SiO_2$ | $TiO_2$ | $ZrO_2$ | $Al_2O_3$ | Cr | TiC | $Ta_2O_5$ |
|---|---|---|---|---|---|---|---|
| Contact Angle $\theta$ | 75° | 45° | 70° | 70° | 40° | 50° | 70° |

Table 1 lists wettability of each magnetic gap material by welding glass ($PbO-SiO_2-Bi_2O_3-B_2O_3$ glass) with a contact angle $\theta$. The smaller the contact angle $\theta$ becomes, the better the wettability becomes. The contact angle $\theta$ was measured by the method shown in FIG. 5. That is, the method comprises the steps of forming a Sendust film 14 of a magnetic metal film with a high saturation magnetization to have a film thickness of 5 μm on a ferrite base 13, forming a film 17 of each magnetic gap material on the formed film 14 to have a film thickness of 800 Å, placing a welding glass 18 with a given weight on the gap material 17, heating the welding glass at 570° C. for forty minutes, and measuring a contact angle $\theta$ of the welding glass 18 against a film 17 of the magnetic gap material with a contact angle meter. The contact angle of the welding glass to the ferrite is 32°, and the contact angle of the welding glass to the Sendust is 62°. As is obvious from Table 1, the magnetic gap materials except Cr and $TiO_2$ are not excellent in wettability by the welding glass.

Next, a description will be directed to abrasion resistance of a magnetic gap material.

At first, Cr, $Al_2O_3$, TiC, and $ZrO_2$ are high in hardness and too high in abrasion resistance. The use of these materials, therefore, allows a magnetic gap portion of a magnetic core to be bulged. The bulge causes spacing loss, resulting an inferior output.

On the other hand, $TiO_2$ is too low in hardness to cause a concave portion on the magnetic gap portion. The magnetic metal film material of the magnetic core is deformed and enters into the concave portion. Hence, the gap is capped so as to make the optical gap shorter, resulting in an inferior output.

$SiO_2$ and $Ta_2O_5$ offer a middle hardness level between $TiO_2$ and Cr and the other materials and are suitable as a magnetic gap material with respect to abrasion resistance. As stated above, however, $SiO_2$ is easy to react to the welding glass, and $SiO_2$ and $Ta_2O_5$ are inferior in wettability by the welding glass.

As set forth above, there are no conventional magnetic gap materials which can solve the foregoing shortcomings.

SUMMARY OF THE INVENTION

It is an object of the present invention to provide a magnetic head having a structure which makes it possible to effectively prevent the reaction between the magnetic alloy film of a magnetic core and a welding glass and to be manufactured at an affordable cost.

It is another object of the present invention to provide a magnetic head which is excellent in strength and abrasion resistance.

It is a further object of the present invention to provide a magnetic head which has an excellent electromagnetic conversion characteristic.

In the first aspect of the present invention, a magnetic head comprises:

a pair of magnetic core half parts abutted to each other;

a magnetic gap material formed on an abutted surface of at least one of the pair of magnetic core half parts and composed of a $Cr_2O_3$ film for forming a magnetic gap; and a welding glass for welding the pair of magnetic core half parts.

Here, the pair of magnetic core half parts may be welded by the welding glass through the $Cr_2O_3$ film.

The pair of magnetic core half parts may each be made of ferrite, and a magnetic alloy film with a high saturation magnetization may be provided on each of the abutted surfaces.

In the second aspect of the present invention, a magnetic head comprises:

a pair of magnetic core half parts abutted to each other;

a magnetic gap material formed on an abutted surface of at least one of the pair of magnetic half parts and composed of laminated films containing an $SiO_2$ film and a $Cr_2O_3$ film for forming a magnetic gap; and a welding glass for welding the pair of magnetic core half parts.

Here, the pair of magnetic core half parts may each be made of ferrite, and a magnetic alloy film with a high saturation magnetization may be provided on each of the abutted surfaces.

The pair of magnetic core half parts may be welded by the welding glass through the laminated films.

The laminated films may be composed of an $SiO_2$ film and a $Cr_2O_3$ film formed in the named order from the magnetic core half part side.

The thickness of the $Cr_2O_3$ film may be in a range from approximately 100 Å to 200 Å.

The laminated films may be composed of a $Cr_2O_3$ film and an $SiO_2$ film formed in the named order from the magnetic core half part side.

The ratio of the thickness of the $Cr_2O_3$ film to the overall thickness of the laminated films may be in a range from 10% to 50%.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A to 1F are perspective views of a manufacturing process of a compound type magnetic core used in a conventional magnetic head;

DETAILED DESCRIPTION OF PREFERRED EMBODIMENTS

Figure 6:
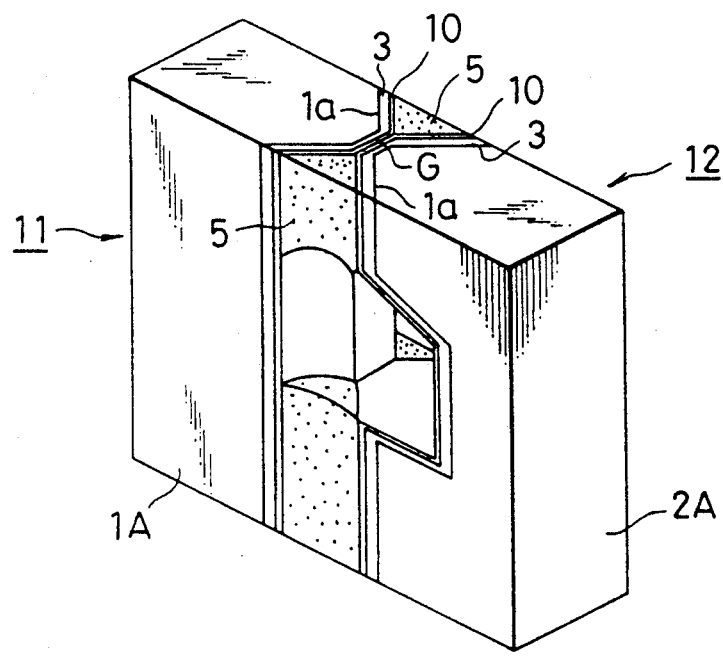
FIGS. 6 and 7 are a perspective view and a partial plan view showing a first embodiment of a magnetic head according to the present invention, respectively.
Figure 7:
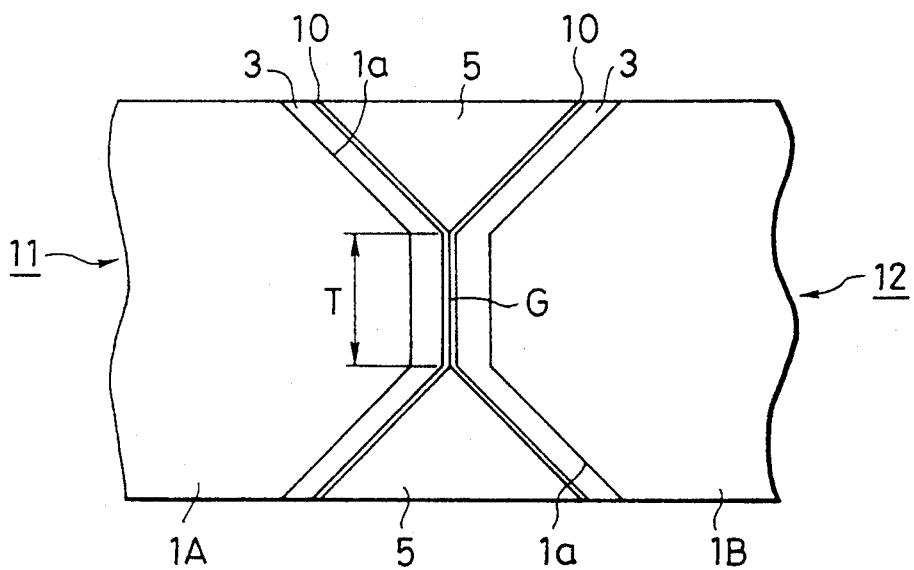

FIGS. 6 and 7 are a perspective view showing an embodiment of a magnetic head according to the present invention and an enlarged plan view showing the circumference of a magnetic gap, respectively. As shown in FIG. 6, a magnetic core according to this embodiment comprises magnetic core half parts 11 and 12 each having a magnetic alloy film 3 formed of Sendust or an amorphous magnetic alloy and a $Cr_2O_3$ film 10 on the surfaces of ferrite blocks 1A and 2A, the magnetic core half parts 11 and 12 being welded to each other by a welding glass 5 in a manner to allow the $Cr_2O_3$ film 10 of both parts to be opposed to each other. The manufacturing process is analogous to that of the conventional magnetic core shown in FIGS. 1A to 1F. The feature of this embodiment is that the $Cr_2O_3$ film 10 being excellent in abrasion resistance is formed on the magnetic alloy film 3. The $Cr_2O_3$ film 10 is formed on the overall surface, which contains a portion facing the magnetic gap G of a track width T of the magnetic alloy film 3. The track width T is defined by a track ditch 1a. As shown in FIGS. 6 and 7, the magnetic core half parts 11, 12 are welded in a manner to allow the $Cr_2O_3$ films 10 to be opposed to each other. The magnetic gap G is formed with the $Cr_2O_3$ film serving as the magnetic gap material. That is, the $Cr_2O_3$ film 10 serves both functions of a protective film for preventing the erosion of the magnetic alloy film 3 and a film of a gap material used for composing the magnetic gap G.

Figure 1C:
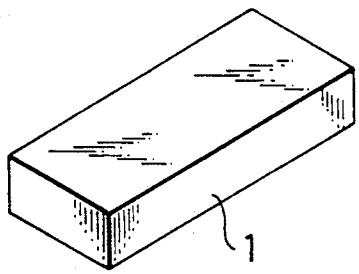
Figure 1C:
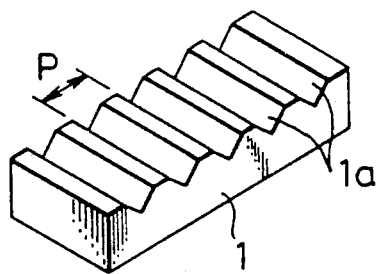
Figure 1C:
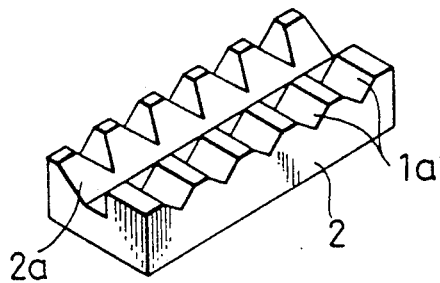
Figure 1D:
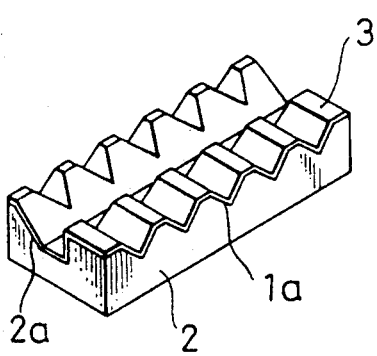
Figure 1D:
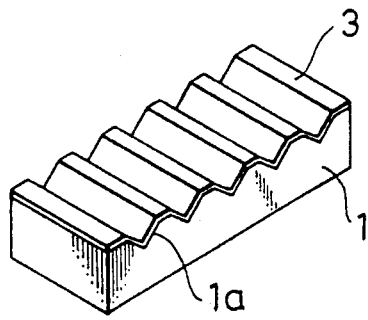
Figure 1E:
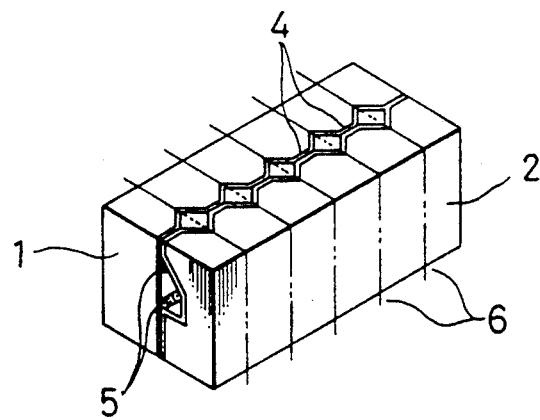
Figure 1F:
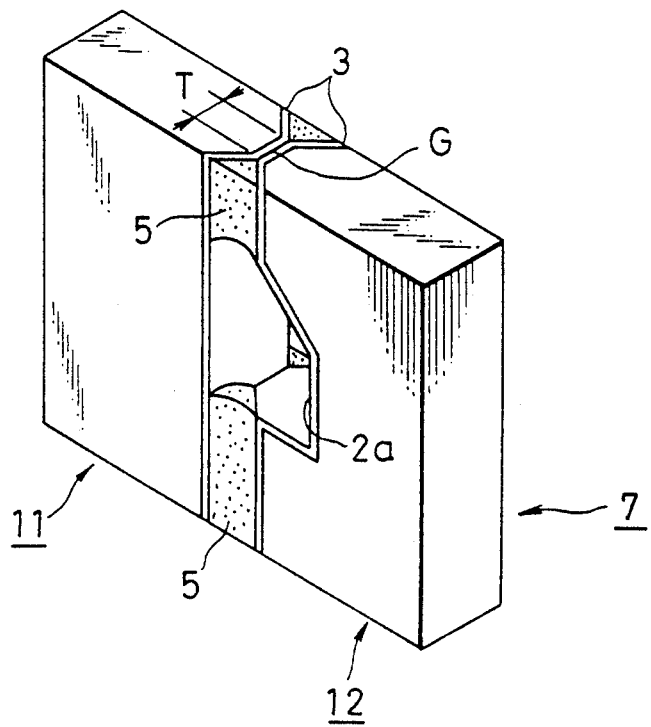
Figure 2:
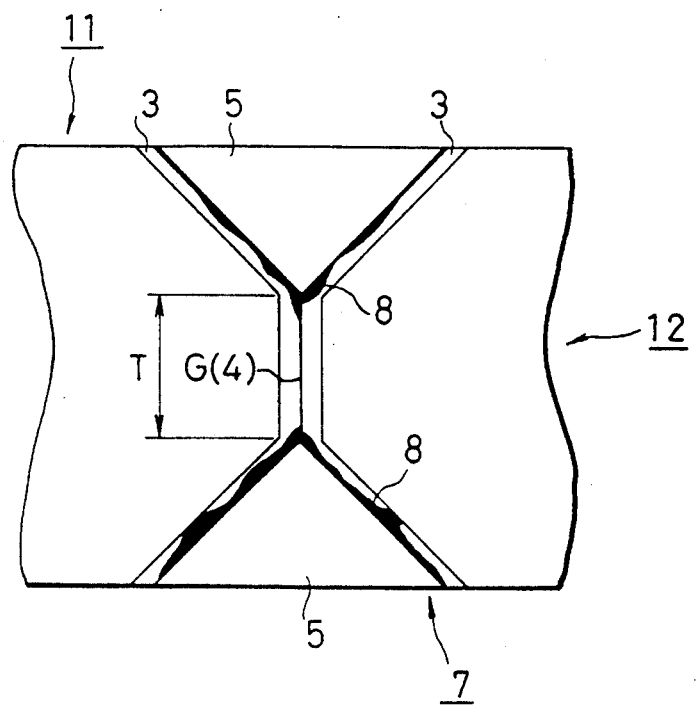
FIG. 2 is a plan view showing the circumference of a magnetic gap having erosion of the magnetic alloy film used in the conventional magnetic core.
Figure 3:
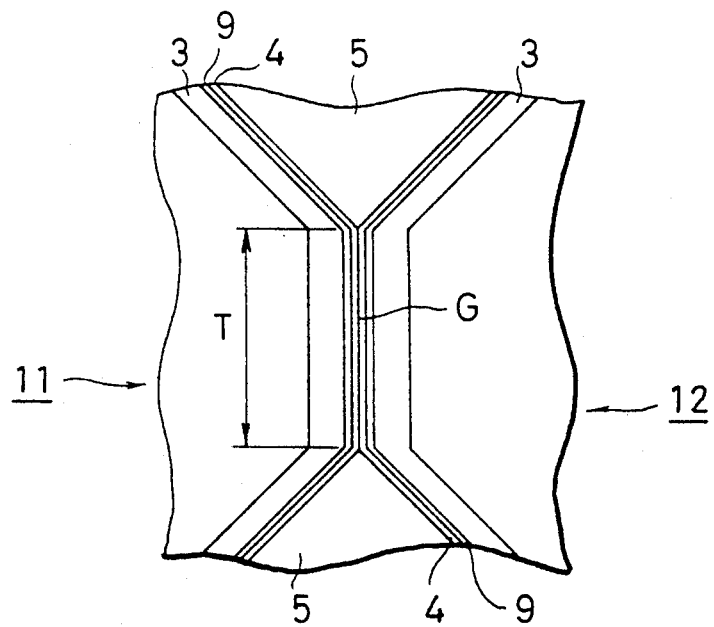
FIGS. 3 and 4 are plan views of the circumference of a magnetic gap showing the structure of a magnetic core used in the conventional magnetic head.

The structure according to this embodiment serves to effectively prevent the erosion of the magnetic alloy film 3 caused by the welding glass 5, by using the $Cr_2O_3$ film 10 which is excellent in corrosion resistance. The $Cr_2O_3$ film 10 serves as both a protective film and a gap-composing film. To define a narrower magnetic gap G, this structure makes it possible to have a thicker $Cr_2O_3$ film 10 than the prior art film composed of a protective layer and a gap material as shown in FIG. 3, resulting in effectively preventing the erosion of the magnetic alloy film 3. Further, the structure according to this embodiment, unlike the prior art shown in FIG. 4, can not cause the erosion at the track width end of the magnetic gap G if the track positions are deviated when the core half parts 11 and 12 are abutted to each other.

Figure 4:
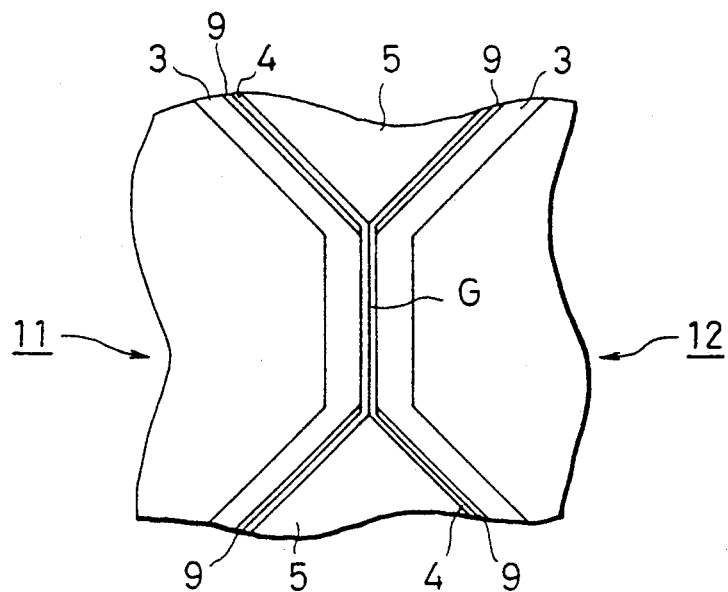
Figure 5:
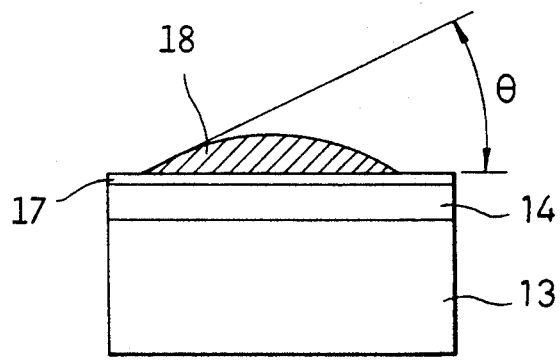
FIG. 5 is a sectional view explaining a wettability test of a magnetic gap material by a welding glass based on measurement of contact angles.

Moreover, this embodiment may be manufactured with the known magnetic core process with one less film forming step compared to the prior art of forming the $SiO_2$ film 4 and the protective film 9 on the magnetic alloy film 3 as shown in FIGS. 3 and 4, resulting in making the manufacturing cost less expensive.

Since the $Cr_2O_3$ film 10 used in this embodiment is quite different from the magnetic alloy film 3 in both color and gloss, the film is utilizable for optically checking the width of the magnetic gap G.

Further, the wettability of $Cr_2O_3$ is higher than that of $Ta_2O_5$ used as materials of the protective film 9 in the prior art shown in FIGS. 3 and 4. The use of $Cr_2O_3$, therefore, enables more excellent glass welding, resulting in improving the yield of a magnetic core.

Figure 8:
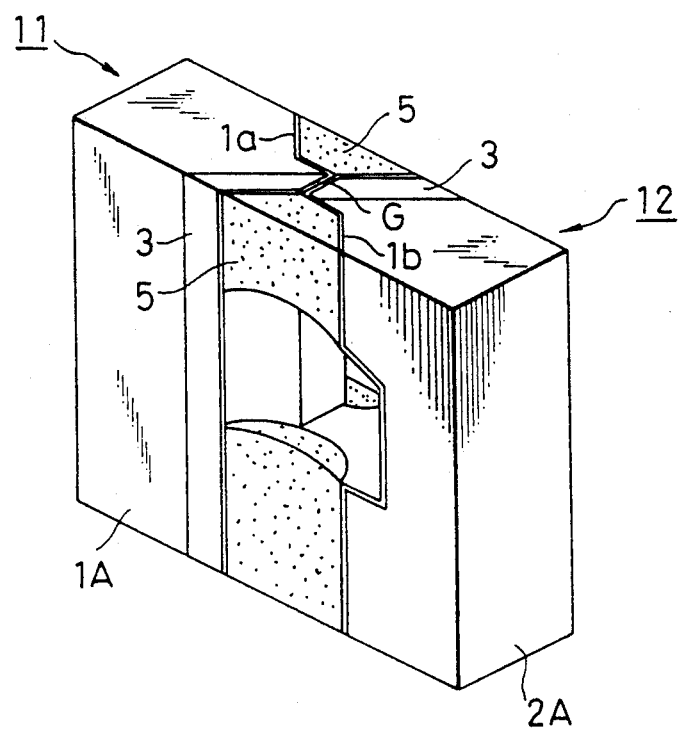
FIGS. 8 and 9 are a perspective view and a partial plan view showing a second embodiment, respectively.
Figure 9:
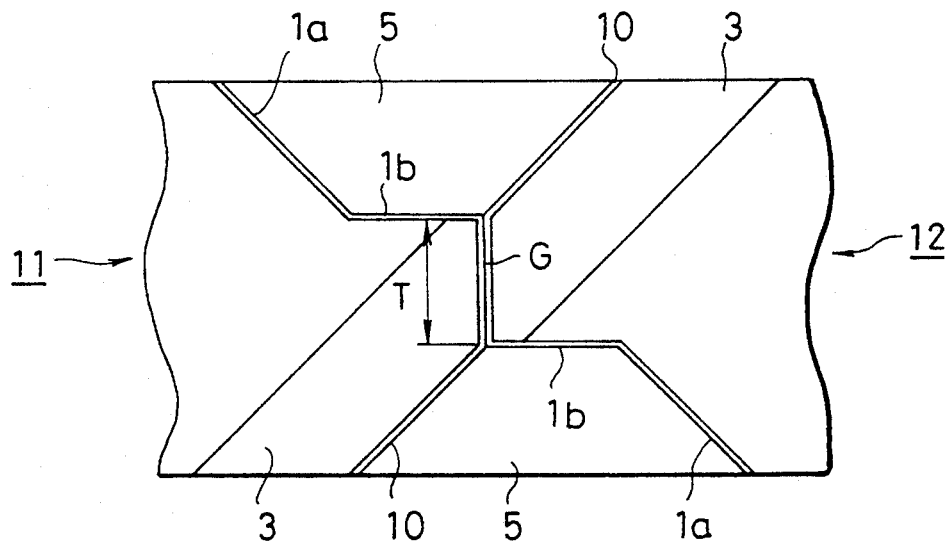

FIG. 8 illustrates a second embodiment of a magnetic head according to the present invention. FIG. 9 is a plan view showing the circumference of the magnetic gap.

As shown in FIGS. 8 and 9, the different features of the second embodiment from that of the first are an abutted surface between the magnetic core half parts 11 and 12 and disposition of the magnetic alloy film 3. That is, the section of the abutted surface between the magnetic core half parts 11 and 12 substantially forms a triangle, a tip side portion of which is vertically cut away. The magnetic alloy film 3 is formed on the other tip side on the triangular section of the abutted surface between the magnetic core half parts 11 and 12. Both ends of the magnetic alloy films 3 are abutted through the magnetic gap G. The $Cr_2O_3$ film 10 is formed on the surface of the magnetic alloy film 3, and on the end of the surface of the film 3 facing the magnetic gap G, and on the magnetic core half parts 11 and 12 in the abutted surface on the surfaces of portions, on which the magnetic alloy film 3 is not formed. As in the first embodiment, the $Cr_2O_3$ film 10 serves as a gap material of the magnetic gap G.

The above-described structure offers the same function and effect as the structure of the first embodiment. It is not necessary to define the shape of the section of the abutted surface between the magnetic core half parts 11 and 12 and disposition of the magnetic alloy film 3. The $Cr_2O_3$ film 10 is merely required on the portion facing the magnetic gap G of the magnetic alloy film 3.

The structure shown in FIG. 8 has a vertical portion 1b on the abutted surface (formed by a track ditch 1a and on which surface the $Cr_2O_3$ film 10 is formed) between the magnetic core half parts 11 and 12. The vertical portion 1b has a quite thin $Cr_2O_3$ film 10 formed thereon, though, the $Cr_2O_3$ film 10 is so excellent in corrosion resistance that a thickness of least 10 Å prevents the erosion of the magnetic alloy film.

Further, the $Cr_2O_3$ film may be employed in the structure of the prior art shown in FIG. 4 in lieu of the $SiO_2$ film 4 for serving as a magnetic gap material. In this structure, by forming the protective film 9 on the magnetic alloy film 3 in advance in the manufacturing process, oxidation of the magnetic alloy film 3 being worked can be prevented.

Figure 10:
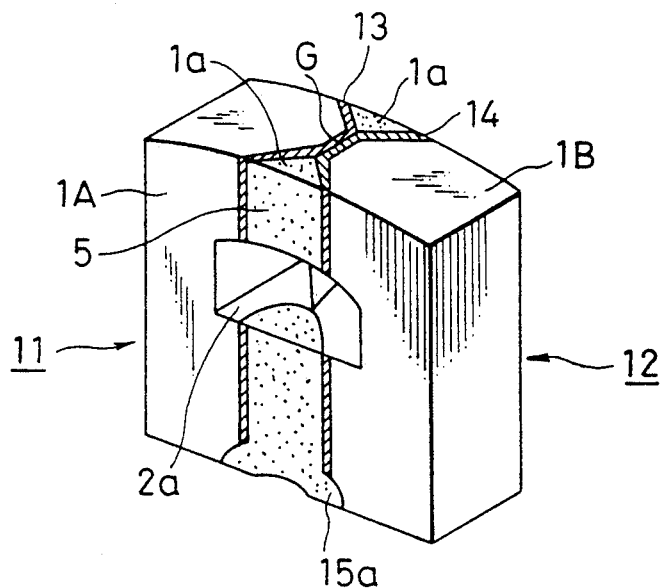
FIGS. 10 and 11 are a perspective view and a partial plan view showing a third embodiment, respectively.

FIG. 10 is a perspective view showing another embodiment of the magnetic head according to the present invention. In FIG. 10, 1A and 1B respectively denote ferrite blocks, and 13 and 14 denote laminated films formed on the ferrite blocks 1A and 1B, respectively. Magnetic core half part 11 comprises the ferrite block 1A and the laminated film 13, and magnetic core half part 12 comprises ferrite block 1B and the laminated film 14. The laminated films 13 and 14 are formed of a magnetic alloy film, an $SiO_2$ film, and a $Cr_2O_3$ film as will be described later. As shown, the top of the laminated film serves as a sliding surface at which a magnetic head slidably contacts a magnetic recording medium.

The magnetic core half parts 11 and 12 are abutted to each other through a magnetic gap G and are welded by a welding glass 5, resulting in composing a complete magnetic core.

At both side portions of the magnetic gap on the sliding surface are formed a track ditch 1a for defining a track width of the magnetic gap G. On a middle portion on the abutted surface between both core half parts is formed a winding ditch 2a for winding a coil. Further, a glass ditch 15 and a back glass ditch 15a are formed along both sides of an abutted surface between the core half parts. Welding glass 5 is filled in the track ditch 1a, and the glass ditches 15 and 15a as shown in FIG. 10.

The magnetic core of the magnetic head according to this embodiment, is a metal-in-gap type as shown above.

Figure 11:
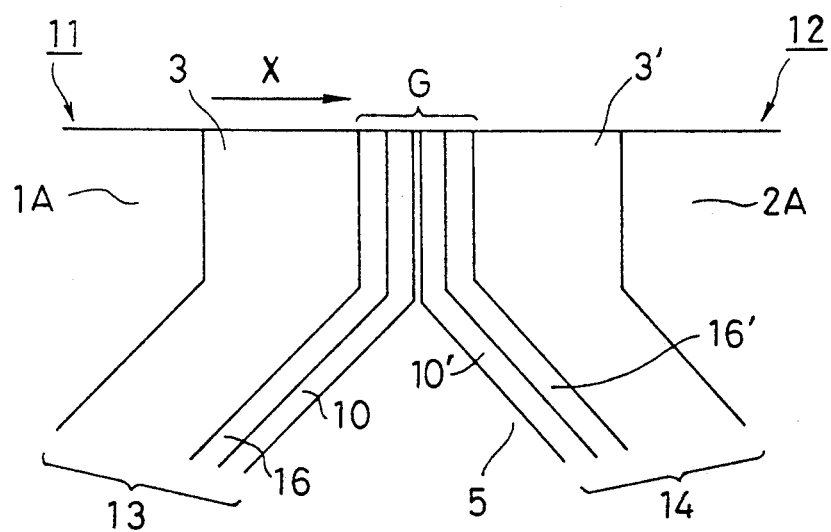

FIG. 11 is a side view showing the circumference of the magnetic gap G of the magnetic core shown in FIG. 10. A metal magnetic film 3 with high saturation magnetization (for example, Sendust film), an $SiO_2$ film 16, and a $Cr_2O_3$ film 10 are sequentially formed on the surface of the ferrite block 1A opposite to the ferrite block 2A. Likewise, on the surface of the ferrite block 2A are formed a magnetic metal film 3', an $SiO_2$ film 16', and a $Cr_2O_3$ film 10' in sequence. These three films respectively compose laminated films 13 and 14. The magnetic core half parts 11 and 12 are abutted in a manner to allow these laminated films to be opposed to each other, and then these parts are welded by the welding glass 5, resulting in composing a magnetic core. The $Cr_2O_3$ films 10, 10', $SiO_2$ films 16, 16', and welding glass 5 serve as the magnetic gap material. Alternatively, in the magnetic gap portion, the $Cr_2O_3$ films 10 and 10' are directly contacted with each other, thereby the $SiO_2$ film 16, 16' and the $Cr_2O_3$ films 10, 10' serving as a magnetic gap material.

It is preferable to use a film thickness of the $Cr_2O_3$ film 10 in the range from 100 Å to 200 Å. The film thickness of the $SiO_2$ film 16 is a result of the required film thickness of the overall magnetic gap material minus the film thickness of the $Cr_2O_3$ film 10. An arrow X shown in FIG. 11 denotes the sliding direction of a recording medium.

Figure 12A:
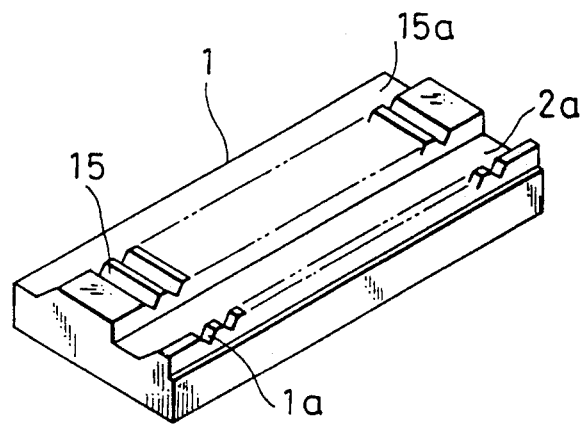
FIGS. 12A to 12C are perspective views of the manufacturing process of a magnetic core shown in FIG. 10.
Figure 12B:
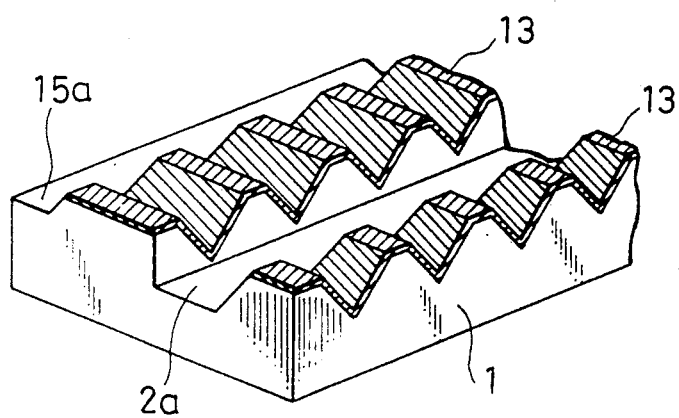
Figure 12C:
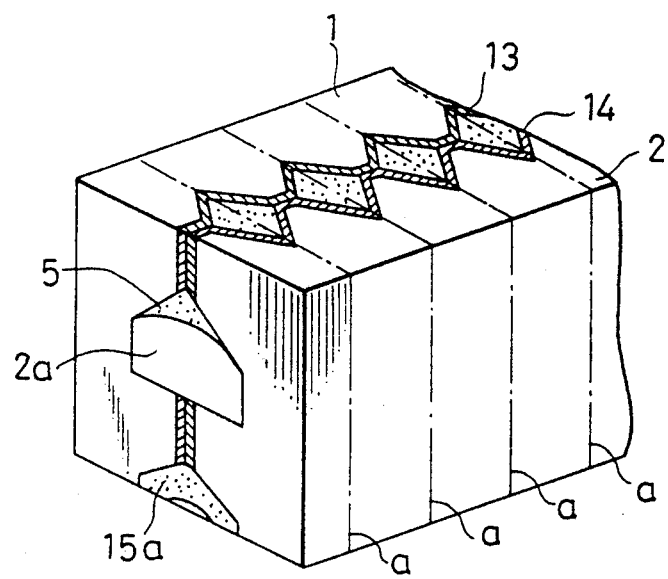

Next, with reference to FIGS. 12A, 12B, and 12C, a description will be directed to the manufacturing process of a magnetic core.

As shown in FIG. 12A, the first step is to work one surface of the rectangular parallelopiped ferrite block using a rotary grinder and form the track ditch 1a and the glass ditch 15 in a manner to have an interval matching to a magnetic gap G.

As shown in FIG. 12B, the second step is to form the magnetic metal film (Sendust film) 3 on the surface of the worked ferrite block 1, form the $SiO_2$ film on the film 3, and then form the $Cr_2O_3$ film 10 on the film 16. The formation of the films 3, 16, 10 is done by a sputtering method. The laminating process of these films results in forming the lamented film 13 shown in FIG. 12B. Then, the winding ditch 2a and the glass ditch 15a are formed so as to compose a core half part block 1 as shown in FIG. 12B.

The third step is to prepare the core half part block 2 produced by the same working and film forming as the core half part block 1, abut these two blocks to each other as shown in FIG. 12C, set a glass between the two core half parts bar consisting of welding glass, melt it at 570° C. for forty minutes, and weld both blocks through the welding glass.

The fourth step is to work the top of the connected core half part blocks cylindrically to form a sliding surface and to cut out the connected core half part blocks along dashed lines in FIG. 12C, thereby producing a magnetic core as shown in FIG. 10. A coil is wound around the magnetic core through the winding ditch 2a, resulting in completing a magnetic head.

According to this embodiment, the magnetic core of the magnetic head has the advantages that the $Cr_2O_3$ film 10 used as a magnetic gap materials is excellent in wettability by the welding glass 5 and offers a large preventive effect for occurrence of a reaction layer between the welding glass 5 and the magnetic metal film 3. As another advantage, the $SiO_2$ film 16 has proper hardness as a magnetic gap material as stated above. It therefore offers an additional advantage that the gap length of the magnetic gap G can be simply measured using an optical microscope since it has a different color from the magnetic metal film 3. The combination of both advantages of the films 10 and 16 affords preferable characteristics from a view point of an overall magnetic gap.

Figure 13:
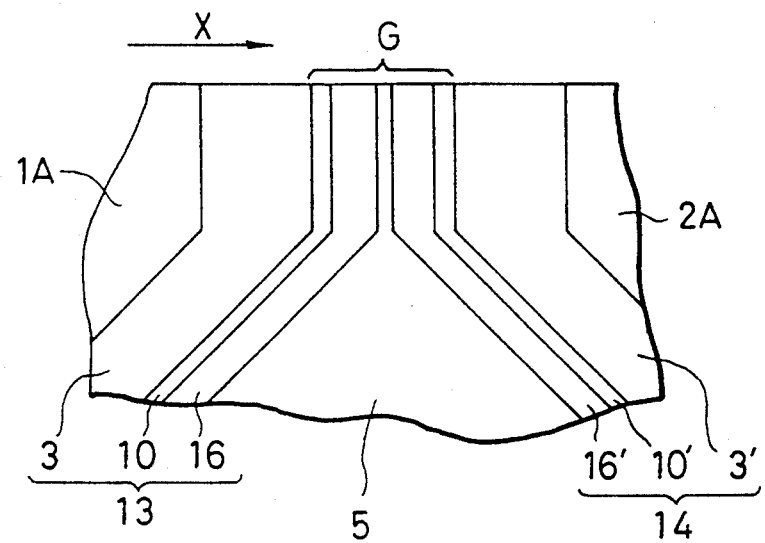
FIG. 13 is a partial side view showing a fourth embodiment.

FIG. 13 is a side view showing the circumference of a magnetic gap according to a fourth embodiment of the present invention. The difference between the embodiment shown in FIG. 13 and that shown in FIG. 11 is the laminating sequence of the laminated film 13(14). That is, according to this embodiment, the forming sequence is the magnetic alloy film 3(3'), the $Cr_2O_3$ 10(10'), and the $SiO_2$ film 16(16') from the side of the ferrite block 1A(2A), resulting in respectively composing the laminated layers 13 and 14. Other aspects of this embodiment are very much the same as the embodiment shown in FIGS. 10 and 11.

According to this embodiment, it is preferable to define the thickness of the $Cr_2O_3$ films 10, 10' to be in the range of 10% to 50% of the overall film thickness of the combined $SiO_2$ films 16, 16'.

The wettability was checked of the welding glass and the change of magnetic head characteristics according to the film-forming sequence of the $Cr_2O_3$ film 10 and the $SiO_2$ film 16 on the metal magnetic film 3.

Forming a Sendust film used as a metal magnetic film with high saturation magnetization to have a 5 μm thickness and forming the $Cr_2O_3$ film and the $SiO_2$ according to the combination shown in Table 2 results in samples 1 to 12.

The first layer in Table 2 contacts the Sendust film 3, that is, denotes the farthest film from the magnetic gap. A second layer is formed on the first layer, that is, denotes a film on the magnetic gap side.

Sample 1 corresponds to the prior art. Samples 2 to 6 correspond to the embodiment shown in FIG. 11. Sample 7 corresponds to the embodiment shown in FIGS. 6 and 8. Samples 8 to 12 correspond to the embodiment shown in FIG. 13.

At first, there was checked wettability of each sample 1 to 12 by the welding glass. As stated above, a certain volume of welding glass was placed on each sample, it was heated and melted for forty minutes at 570° C., a contact angle θ between a drop of welding glass and the film of each magnetic gap material was measured by a contact angle meter. Table 3 shows the result.

As will be obvious from the Table 3, sample 1 having only the $SiO_2$ film was inferior in wettability having a contact angle of 73°. Sample 7 having only the $Cr_2O_3$ film laminated thereon was excellent in wettability having a contact angle of 43°. The lamination of the $SiO_2$ and $Cr_2O_3$ films offers somewhat better wettability by having the first layer film as the $SiO_2$ film instead of the first layer film as the $Cr_2O_3$ film. Either one of the laminated films, however, is an improvement over sample 1 having only the $SiO_2$ film, resulting in superior characteristics for the magnetic gap material of the magnetic head.

Next, the interface between the welding glass and the laminated film is observed to check the occurrence of a reaction with the welding glass. In samples 1 and 8 to 12 in which $SiO_2$ contacts the welding glass 5, the reaction layer between the $SiO_2$ film and the glass was observed.

| Sample | First Layer | Second Layer |
|---|---|---|
| 1 | $SiO_2$ 800 Å | None |
| 2 | $SiO_2$ 700 Å | $Cr_2O_3$ 100 Å |
| 3 | $SiO_2$ 600 Å | $Cr_2O_3$ 200 Å |
| 4 | $SiO_2$ 400 Å | $Cr_2O_3$ 400 Å |
| 5 | $SiO_2$ 200 Å | $Cr_2O_3$ 600 Å |
| 6 | $SiO_2$ 100 Å | $Cr_2O_3$ 700 Å |
| 7 | $Cr_2O_3$ 800 Å | None |
| 8 | $Cr_2O_3$ 700 Å | $SiO_2$ 100 Å |
| 9 | $Cr_2O_3$ 600 Å | $SiO_2$ 200 Å |
| 10 | $Cr_2O_3$ 400 Å | $SiO_2$ 400 Å |
| 11 | $Cr_2O_3$ 200 Å | $SiO_2$ 600 Å |
| 12 | $Cr_2O_3$ 100 Å | $SiO_2$ 700 Å |

TABLE 3

| Sample | Contact Angle θ |
|---|---|
| 1 | 73° |
| 2 | 43° |
| 3 | 39° |
| 4 | 48° |
| 5 | 45° |
| 6 | 43° |
| 7 | 43° |
| 8 | 45° |
| 9 | 53° |
| 10 | 50° |
| 11 | 56° |
| 12 | 57° |

However, in the samples 8 to 12, no reaction between the magnetic alloy film and the welding glass was observed. On the other hand, in samples 2 to 5 in which $Cr_2O_3$ and glass contact each other, a reaction layer is generated as the thickness of the $Cr_2O_3$ film is gradually reduced, though, the amount of the reaction layer was far smaller than that of the samples employing of the $SiO_2$ film only. Yet, if the thickness of the $Cr_2O_3$ is defined to be lower than 100 Å, the amount of the reaction layer becomes far larger and, further, it is difficult to adjust the film thickness. The thickness of the $Cr_2O_3$ film is required to be larger than or equal to 100 Å.

Figure 14:
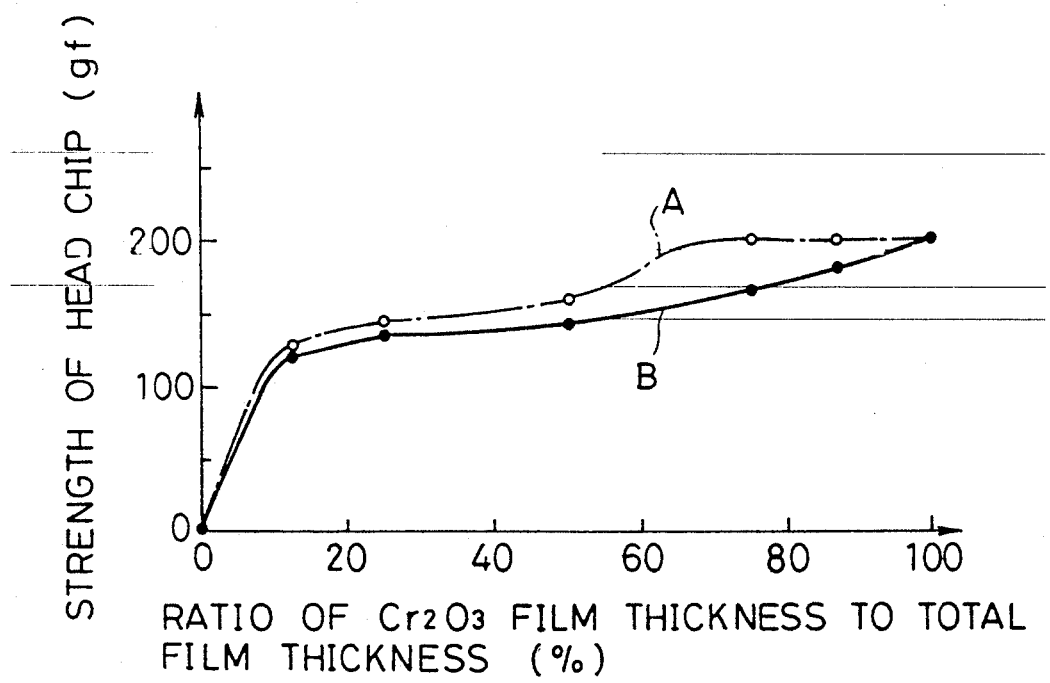
FIG. 14 is a diagram showing the relationship between a ratio of a thickness of a $Cr_2O_3$ film to the overall film thickness and head chip strength.

Next, a head was made to test each of the samples 1 to 12, resulting in making a head chip according to the manufacturing process as set forth above. The strength of each head chip obtained as above was evaluated for cracking strength when one core half part was fixed and the other chip is subject to shearing force. The result was indicated in Table 4. FIG. 14 is a graph drawn from the data of the Table 4, where the abscissa denotes the ratio of a $Cr_2O_3$ film thickness to an overall film thickness. A curve A indicates strength of the laminated layer in case of allocating $Cr_2O_3$ film to the first layer, and a curve B indicates strength of the laminated layer in case of allocating an $SiO_2$ film to the first layer.

TABLE 4

| Sample | Cracking Strength |
|---|---|
| 1 | 0 g · f |
| 2 | 120 g · f |
| 3 | 135 g · f |
| 4 | 143 g · f |
| 5 | 165 g · f |
| 6 | 180 g · f |
| 7 | 200 g · f |
| 8 | 200 g · f |
| 9 | 200 g · f |
| 10 | 160 g · f |
| 11 | 145 g · f |
| 12 | 130 g · f |

The head chip made of the sample 1 having only $SiO_2$ films offers nearly zero (0) strength, though, the strength raises with increase of a ratio of the thickness of $Cr_2O_3$ film to an overall film thickness totalling an $SiO_2$ film thickness and a $Cr_2O_3$ film thickness. And, under the fixed ratio, a higher strength is offered in case of allocating the $SiO_2$ film to the second layer contacting with the glass.

Next, two types of magnetic cores were made. One magnetic core had the structure shown in FIGS. 11 and 12 wherein the $Cr_2O_3$ film 10 and the $SiO_2$ film 16 with a different thickness were laminated, that is, the laminated films corresponding to the samples 2, 3, and 4 in the Table 2 were formed. The other magnetic core had the structure shown in FIGS. 6 and 7 wherein the laminated films corresponding to the sample 7 shown in Table 2 were formed. Magnetic heads for a digital audio tape recorder, each of the heads having a track width of 24 μm and a magnetic gap width of 0.25 μm, were produced using these magnetic cores. Table 5 indicates the measured results of frequency characteristics of self-recording and -reproducing outputs. For this test, a metal tape is used as a recording medium, and the relative speed between the tape and head is 3.14 m/sec. Each numeric value in Table 5 indicates a voltage drop between a top peak and a bottom peak in dB.

TABLE 5

| Sample | $SiO_2$ | $Cr_2O_3$ | 0.13 MHz | 1.2 MHz | 4.7 MHz | 6.0 MHz |
|---|---|---|---|---|---|---|
| 2 | 700 Å | 100 Å | −86.5 | −74.2 | −78.9 | −82.6 |
| 3 | 600 Å | 200 Å | −86.4 | −74.4 | −79.5 | −83.7 |
| 4 | 400 Å | 400 Å | −87.0 | −74.7 | −79.8 | −84.1 |
| 7 | 0 Å | 800 Å | −87.0 | −74.7 | −80.5 | −84.6 |

Figure 15:
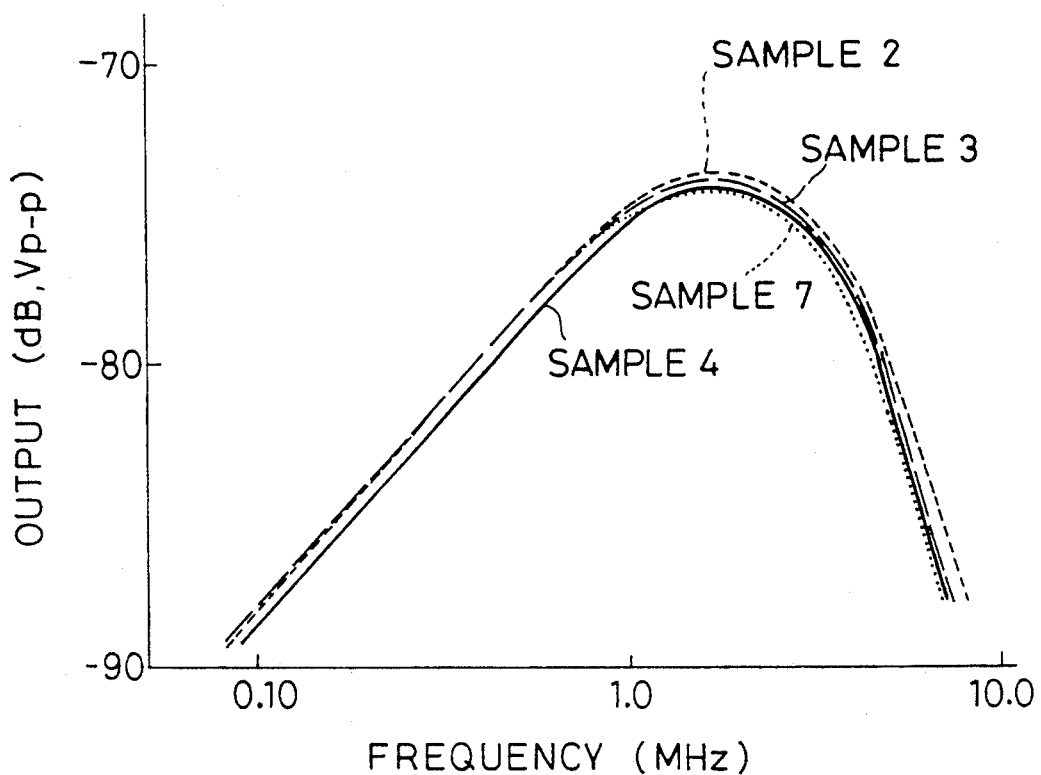
FIG. 15 is a digram showing the frequency characteristics of the self-recording and reproducing output of the magnetic heads.
Figure 16:
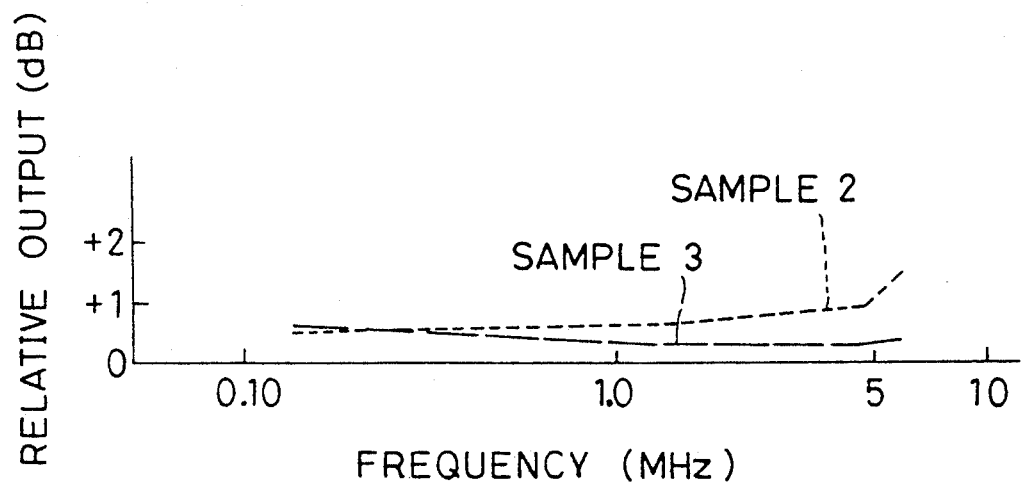
FIG. 16 is a diagram showing relative outputs of samples 2 and 3 against a sample 4.

The measured results of the self-recording and -reproducing output characteristics are indicated in a graph in FIG. 15. FIG. 16 is a graph showing relative outputs of samples 2 and 4 when the output of sample 4 in Table 5 is assumed as 0 dB.

As is obvious from Table 5, FIG. 15, and FIG. 16, the characteristics in a higher frequency range are improved as the thickness of the $Cr_2O_3$ film becomes thinner. Hence, it is assumed that if only the $SiO_2$ film is left as a result of changing the thickness of the $Cr_2O_3$ film to zero, the characteristics in the higher frequency range are improved. However, it causes the welding glass to be reacted with the magnetic metal film, resulting in producing a reaction layer. The layer makes the welding strength due to the welding glass more fragile or dropped off. It means that the use of only the $SiO_2$ film is improper in a magnetic head.

On the other hand, with thickening of the $Cr_2O_3$ film, the characteristics become inferior, because high hardness of $Cr_2O_3$ causes the gap portion to bulge, thereby causing spacing loss. At a frequency of F=6 MHz, the output of sample 7 is made inferior by 2 dB than that of sample 2. Hence, assuming that this inferiority is due to spacing loss, the amount of bulge d=190 Å is presumed on the basis of the equation;

$$loss = -54.6 \times d/\lambda$$

(λ: recording wavelength, d: amount of a bulge) The value is substantially equal to the value of the bulge measured by a surface coarse meter. It, therefore, supports the proposition that the inferior characteristics in a high frequency range are due to spacing loss.

As set forth above, the best sequence of the $Cr_2O_3$ film and the $SiO_2$ film is the sequence shown in FIG. 11 with respect to the wettability by glass. Also in this sequence, if the thickness of the $Cr_2O_3$ is made smaller than 100 Å, the welding glass 5 is more easily reacted with the $SiO_2$ film 16. If it is larger than 200 Å, output drop due to spacing loss takes place. It is, therefore, better to define the thickness of the $Cr_2O_3$ film 10 to be in the range of 100 Å to 200 Å.

Next, magnetic heads for a still video camera were produced. Each of the magnetic heads included each of the laminated films made of samples 1 to 12 and a track width of 60 μm, respectively. Table 6 indicates the self-recording and -reproducing characteristics of magnetic heads at each frequency given when a metal disc was used as a recording medium.

TABLE 6

| Sample | 1 MHz | 4 MHz | 7 MHz | 9 MHz | 11 MHz | Decision |
|---|---|---|---|---|---|---|
| 1 | 62.8 | 61.0 | 65.0 | 70.0 | 75.0 | ☺ |
| 2 | 64.0 | 62.7 | 66.9 | 71.0 | 76.0 | ∘ |
| 3 | 65.3 | 63.9 | 67.6 | 71.8 | 76.8 | ∘ |
| 4 | 66.4 | 64.7 | 68.7 | 72.1 | 76.7 | |
| 5 | 67.2 | 66.0 | 69.8 | 72.3 | 77.0 | |
| 6 | 68.0 | 67.0 | 70.2 | 72.5 | 77.2 | |
| 7 | 69.2 | 67.5 | 71.2 | 72.6 | 77.3 | |
| 8 | 68.9 | 66.8 | 70.2 | 72.5 | 77.0 | |
| 9 | 67.0 | 65.5 | 69.6 | 72.0 | 76.6 | |
| 10 | 66.0 | 64.0 | 68.0 | 72.1 | 76.7 | ∘ |
| 11 | 64.8 | 63.0 | 67.0 | 71.5 | 76.0 | ∘ |
| 12 | 63.0 | 62.5 | 66.5 | 70.8 | 75.9 | ∘ |

As is apparent from Table 6, the head of sample 1, that is, the head having only $SiO_2$ films as a magnetic gap material, offers the most excellent characteristics. However, as is apparent from Table 4, this head is not available since its strength is quite low. Among the available heads, the heads of the samples 2, 3, 10, 11, and 12 exhibit reasonable characteristics. Each of these heads has a ratio of a thickness $Cr_2O_3$ film to an overall film thickness totalling an $SiO_2$ film and a $Cr_2O_3$ film in the range from 10% to 50%.

Figure 17:
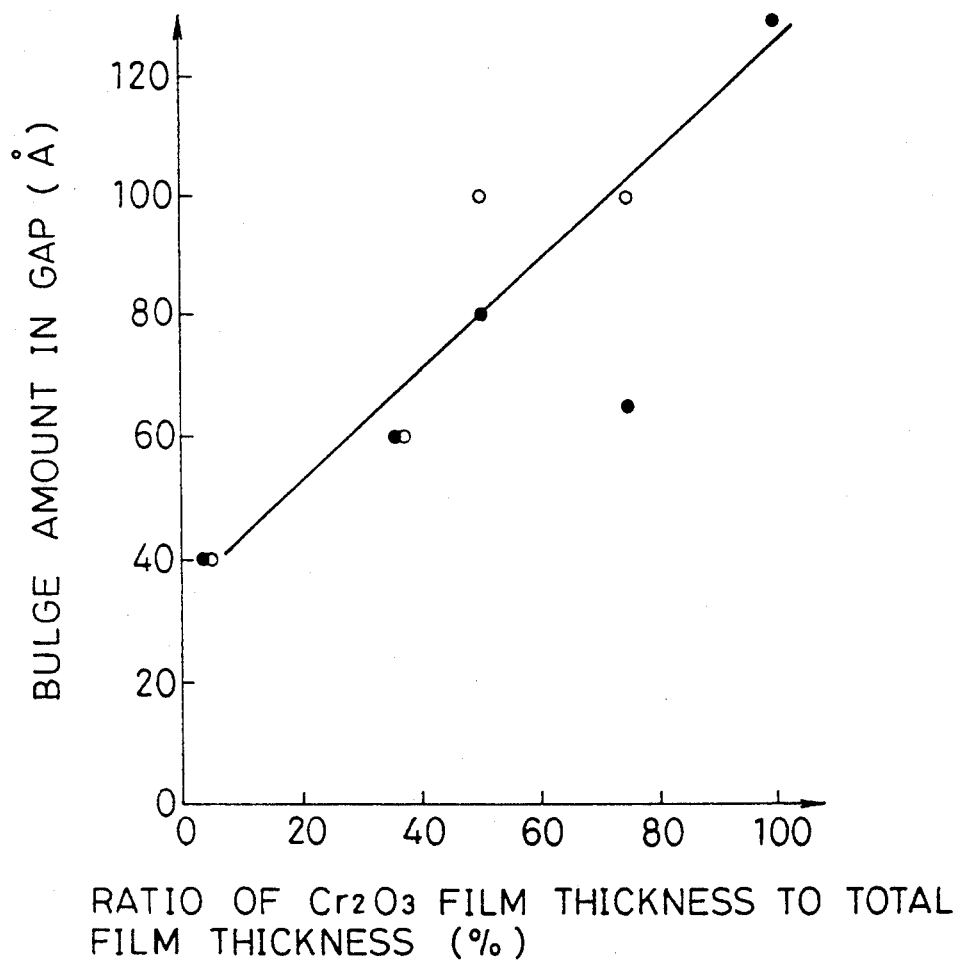
FIG. 17 is a diagram showing the relationship between the ratio of the thickness of a $Cr_2O_3$ film to the overall film thickness and the amount of bulge of a magnetic gap.

Next, FIG. 17 shows the relationship of the bulge amount of a magnetic gap and the ratio of a thickness of a $Cr_2O_3$ film to an overall film thickness totalling an $SiO_2$ film and a $Cr_2O_3$ film. As is apparent from FIG. 17, with an increase of a ratio of the $Cr_2O_3$ film, the bulge amount increases. The above-mentioned difference of the self-recording and reproducing characteristics is considered on the spacing loss due to the bulge.

Finally, how bubbles are generated in the welding glass was checked in each of the head chips of samples 1 to 12. A bubble-generating ratio means a ratio of samples with bubbles of 10 μm or larger in diameter to 100 samples. The results are shown in Table 7.

TABLE 7

| Sample | Bubble-Generating Ratios |
|---|---|
| 1 | 10% |
| 2 | 6% |
| 3 | 6% |
| 4 | 12% |
| 5 | 15% |
| 6 | 20% |
| 7 | 35% |
| 8 | 15% |
| 9 | 5% |
| 10 | 0% |
| 11 | 3% |
| 12 | 1% |

As is apparent from Table 7, the head of sample 7, that is, the head having only $Cr_2O_3$ films laminated as a magnetic gap material generates a lot of bubbles. As the thickness of the $Cr_2O_3$ film becomes smaller in the head, the generated bubbles become fewer. If the ratio of the thickness of the $Cr_2O_3$ film to the total film thickness is fixed, the generated bubbles become fewer in case where the second layer contacting the glass is an SiO$_2$ film.

As set forth above, by forming a Cr$_2$O$_3$ film on a magnetic alloy film having a high saturation magnetization and using the Cr$_2$O$_3$ film as a gap material, wettability by the welding glass is improved, thereby making the welded magnetic head stronger. Also forming of the Cr$_2$O$_3$ film serves to prevent an erosion due to the welding glass.

By forming an SiO$_2$ film on a magnetic alloy film and a Cr$_2$O$_3$ film on the resulting film, the laminated films produced serve as a magnetic gap material, thereby improving wettability by welding glass and making the magnetic head stronger. The magnetic head employing the laminated films offers more excellent electromagnetic converting characteristics than the magnetic head employing a single Cr$_2$O$_3$ film as a magnetic gap material. In particular, when a Cr$_2$O$_3$ film as a first layer and an SiO$_2$ film as a second layer are used in a magnetic head, the head has more excellent strength and electromagnetic converting characteristics. Further, in such a head, fewer bubbles generate in the welding glass.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the scope and true spirit of the invention.

What is claimed is:

1. A magnetic head comprising:
   first and second abutting magnetic core half parts, each of said first and second magnetic core half parts having a reference surface and an opposing surface extending in a direction perpendicular to said reference surface, said reference surfaces being coplanar and each of the opposing surfaces of said first and second magnetic core half parts having a first portion parallel to a corresponding first portion of the opposing surface of the other magnetic core half part and a second portion which is not parallel to said first portions;
   Cr$_2$O$_3$ films formed on the first and second portions of the opposing surfaces of said first and second magnetic core half parts to form a magnetic gap aligned along the first portions of said opposing surfaces, the Cr$_2$O$_3$ films formed on the second portions of said first and second opposing surfaces extending from the Cr$_2$O$_3$ films formed on the first portion of the corresponding opposing surface to the corresponding reference surface, the opposed Cr$_2$O$_3$ films formed on said first portions serve as magnetic material, said magnetic gap being operable for recording and/or reproducing signals on and/or from a magnetic recording medium; and
   a welding member interposed between the second portions of said first and second opposing surfaces for welding together said first and second magnetic core half parts, said welding member comprising a welding glass for welding said first and second magnetic core half parts through the Cr$_2$O$_3$ films formed on the second portions of said first and second opposing surfaces.

2. A magnetic head as claimed in claim 1, wherein each of said first and second magnetic core half parts is made of ferrite, and a magnetic alloy film having a high saturation magnetization is disposed on each of said opposing surfaces.

3. A magnetic head as claimed in claim 1, wherein the Cr$_2$O$_3$ films formed on the first portions of said opposing surfaces are contiguous.

4. A magnetic head as claimed in claim 1, wherein no non-magnetic layer is interposed between said first and second magnetic core half parts and said Cr$_2$O$_3$ films.

5. A magnetic head comprising:
   first and second abutting magnetic core half parts, each of said first and second magnetic core half parts having a reference surface and an opposing surface extending in a direction perpendicular to said reference surface, said reference surfaces being coplanar and each of the opposing surfaces of said first and second magnetic core half parts having a first portion parallel to a corresponding first portion of the opposing surface of the other magnetic core half part and a second portion which is not parallel to said first portions;
   laminated films comprising Cr$_2$O$_3$ and SiO$_2$ films formed on the first and second portions of the opposing surfaces of said first and second magnetic core half parts to form a magnetic gap aligned along the first portions of said opposing surfaces, the opposed Cr$_2$O$_3$ films formed on said first portions serve as magnetic gap material, the Cr$_2$O$_3$ films formed on the second portions of said first and second opposing surfaces extending from the Cr$_2$O$_3$ films formed on the first portion of the corresponding opposing surface to the corresponding reference surface, said magnetic gap being operable for recording and/or reproducing signals on and/or from a magnetic recording medium; and
   a welding member interposed between the second portions of said first and second opposing surfaces for welding together said first and second magnetic core half parts, said welding member comprising a welding glass for welding said first and second magnetic core half parts through the laminated films formed on the second portions of said first and second opposing surfaces.

6. A magnetic head as claimed in claim 5, wherein each of said first and second magnetic core half parts is made of ferrite and a magnetic alloy film having a high saturation magnetization is disposed on each of said opposing surfaces.

7. A magnetic head as claimed in claim 5, wherein each of said Cr$_2$O$_3$ films has a thickness range from approximately 100 Å to 200 Å.

8. A magnetic head as claimed in claim 5, wherein the Cr$_2$O$_3$ films formed on the first portions of said opposing surfaces are contiguous.

* * * * *